Patented Oct. 24, 1944

2,361,315

UNITED STATES PATENT OFFICE 2,361,315

MANUFACTURE OF SOLID INVERTASE PRODUCTS

Carl A. Neuberg, New York, N. Y., assignor to Warwick Chemical Corp., New York, N. Y., a corporation of New York No Drawing. Application July 22, 1941, Serial No. 403,529

3 Claims. (Cl. 195—68)

This invention relates to the manufacture of solid invertase products.

As is well known, enzymes present in the cells of yeast (such as proteases, carbohydrases, esterases) can be dissolved by autolysis. It also has been known for several decades that dissolved enzymes can be combined with absorbent agents by absorption and also can be separated again from these absorbing agents. The enzymes, when in soluton, mostly are of limited stability. In the case of invertase solutions, precipitates resulting from treatment with alcohol, acetone, etc., are unstable. The old experience that enzymes can be active even in a fixed state has been more widely publicized by S. G. Hedin (Biochem. Journal 2, 81 and 112, 1906). However, there has been no method of preparing invertase as a solid, dry and stable absorbate. Absorbates such as obtained in wet condition by the aid of charcoal, ferric hydroxide, aluminum hydroxide, or arsenic sulfide, are unstable. Moreover, they are unsuitable for technical purposes on account of their poisonous effects and their lack of proper appearance.

My invention relates to a new method permitting the producton of solid invertase.

I have discovered that invertase can be prepared as a dry and non-poisonous and very active and stable white powder by combining a solution of invertase, which has been subjected to a previous purification, with insoluble non-poisonous salts of non-poisonous acids of alkaline earths.

The compounds, according to this invention, are free from disturbing materials, and they are tasteless and odorless.

Example 1

5 kg. pressed yeast (of the top or bottom fermenting type) which should be as dry as possible are put in 10 liters of tap water at room temperature. 250 ml. chloroform and 250 ml. toluol are added, or 250 ml. ethyl acetate and 250 ml. toluol, or any other organic or inorganic substances of plasmolytic action, also 100 grams of solid, finely powdered calcium carbonate. The mixture is grated or agitated or shaken whereby fast liquefaction is performed. In the case of top-fermenting yeast, the mixture is allowed to stand for five days, while three days will be sufficient for bottom-fermenting yeast. During the early part of these periods, the cover of the receptacle should be lifted from time to time. After this, the mixture is centrifuged or filtered by suction. The resultant liquid is light yellow to brownish in color, depending upon the kind of yeast used. This liquid is preserved under toluol and can thus be kept without disadvantage.

For purification of the above liquid, to each 600 ml. of the latter is added a solution of 24 grams aluminum chloride ($AlCl_3.6H_2O$) in 1 liter of water. This should be added in one portion. Sometimes, a slight precipitate is formed, which is to be disregarded. Immediately after this, a solution of 7.8 grams primary sodium phosphate ($NaH_2PO_4.2H_2O$) and 18 grams secondary sodium phosphate ($Na_2HPO_4.12H_2O$) in 1 liter water is added. (The equivalent amounts of potassium or ammonium salts can be used instead of the sodium compounds. The aluminum salt may be replaced by iron salt). For top-fermenting yeast, ⅓ to ½ of the amounts given above for the aluminum salts and phosphates usually are sufficient due to the higher degree of purity of this kind of yeast. A flaky, gelatinous precipitate is now formed consisting of aluminum phosphate (precipitate I).

Precipitate I is removed by filtration or centrifugation.

The clear solution of invertase (invertase-solution A—1) now is but slightly yellow and free from odors. This solution is carefully neutralized by adding dropwise 25% of ammonia, as long as Merck's universal indicator remains yellow. This indicator must never show a greenish color or shade.

The newly formed precipitate of aluminum phosphate is called precipitate II. It removes from the solution impurities and coloring matter. The precipitate is filtered off, and the filtrate (invertase-solution A—2) now is almost colorless.

In order to dissolve the enzyme absorbed by the precipitates I and II, the two precipitates are combined and suspended in a solution of 48 grams of the above mentioned primary sodium phosphate in 1 liter water. This suspension is shaken or agitated for about one hour. Most of the invertase present thereby dissolves. The filtered liquid is carefully neutralized with 25% ammonia. No considerable precipitate forms, but in case some flakes will form, they are filtered off. The resultant clear liquid is the invertase-solution A—3.

To the main solution, A—2, 25% of ammonia is added until the liquid is almost neutral. A solution of 100 grams calcium chloride ($CaCl_2.6H_2O$) in 2 liters water is added immediately. Without regard to a possible formation of a slight precipitate because of this treatment, said main invertase-solution A-2 is precipitated with invertase-solution A-3 under constant agitation. The precipitate now obtained consists of calcium phosphate and contains the main amount of invertase. The precipitate is centrifuged. It also can be filtered off.

The precipitate containing the invertase is washed with cold water in the centrifuge until the wash water shows no more chlorine reaction. It is then dried as fast as possible on clay, or with acetone or in another appropriate manner, and is mixed intimately with 20 grams of acid potassium phosphate ($KH_2PO_4$). As a safety measure, a small quantity of solid potassium phosphate (no definite amount) is poured on top of the mixture, which now contains secondary phosphate. This mixture is dried completely in a desiccator. Instead of the acid potassium phosphate, bitartrate or saccharate of potassium, tartaric acid, mucic acid, citric acid and similar compounds can also be used as stabilizers. A sample of the precipitated material, when suspended in distilled water, should cause the Merck universal indicator to assume a yellow color, without any trace of green hue or shade.

It is to be recommended that all precipitations, i. e. the treatments with aluminum salt, calcium chloride, phosphate, ammonia, etc., are finished in the course of a single day, and that the substance, mixed with the potassium mono phosphate, is dried the same day.

The dried material then is finely powdered. Its activity will remain the same over a period of many months. From 600 ml. invertase-solution, 50 to 60 grams of dry material are obtained.

Inversion up to zero rotation, i. e. splitting of cane sugar to 75.75%, is accomplished within about 15 minutes, if 100 ml. of an 8 per cent saccharose solution are treated with 0.2 to 0.5 gram of the dry preparation, as obtained above, at 37° C.

Instead of aluminum and calcium chloride every other soluble earth alkaline and aluminum salt can be used. The corresponding strontium or magnesium salts can be substituted for, e. g., the calcium compounds. Acids which are non-poisonous and form insoluble earth salts, e. g. citric or tartaric acid, can be substituted for phosphoric acid. The preparation, in this case, is analogous to the method as outlined above.

If the invertase as collected from the precipitates I and II is not to be collected, the invertase-solution A-2 is treated directly with a solution of 45 grams sodium mono phosphate or of 100 grams di-sodium phosphate in about 2 liters of water, and one then proceeds as above.

Example 2

If light-colored yeast is available, the procedure may be considerably simplified and shortened, as follows:

1,000 ml. of the plasmolysate are mixed with 20 to 30 ml. m-$CaCl_2$ and with 40 to 60 ml. m/2-$Na_2HPO_4$. After shaking, the precipitate which settles fast is removed. From the clear filtrate, the substance is precipitated with 210 ml. m-$CaCl_2$ and 400 ml. m/2-$Na_2HPO_4$. The precipitate filters easily. The further preparation is the same as above.

Example 3

1,000 ml. of plasmolysate are mixed with 21 ml. $FeCl_3$, then with 14 ml. m-$(NH_4)_2HPO_4$. The resulting water clear filtrate of the iron phosphate precipitate is treated with 210 ml. m-$SrCl_2$ and 400 ml. m/2$K_2HPO_4$ as described above.

Example 4

1,000 ml. plasmolysate are evaporated in vacuo to 200 ml. at a temperature not exceeding 35° C. If necessary, a precipitate is filtered off; and 200 ml. of an m-solution of Rochelle salt (K-Na-tartrate) are added. Furthermore, 50 ml. of 4-m $CaCl_2$ are added. The precipitate whose volume increases at rest can be easily filtered off or centrifuged. It contains the invertase. Drying and stabilizing is performed as above described.

I have described preferred embodiments of my invention, but it is understood that changes and omissions may be made without departing from the spirit of this invention.

What I claim is:

1. The process of manufacturing an adsorbate containing invertase which consists in purifying a solution of invertase with a small amount of aluminum salt and alkali phosphates and combining said solution with water-insoluble salts of the acids of the group consisting of phosphoric acid, citric acid, tartaric acid, mucic acid, said salts containing as basic component a substance of the group consisting of strontium, calcium, magnesium.

2. In the manufacture of adsorbate of invertase the step which consists in treating a solution of invertase with calcium chloride and secondary sodium phosphate to produce a small amount of a precipitate for purification purposes only, to eliminate the precipitate, and in combining the remaining solution with water-insoluble salts of the acids of the group consisting of phosphoric acid, citric acid, tartaric acid, mucic acid, said salts containing as basic component a substance of the group consisting of strontium, calcium, magnesium.

3. The process of manufacturing a solid, dry and stable adsorbate containing invertase which consists in combining a solution of invertase with water-insoluble salts of the acids of the group consisting of phosphoric acid, citric acid, tartaric acid, mucic acid, said salts containing as basic component a substance of the group consisting of strontium calcium, magnesium, and stabilizing said adsorbate by the addition of acid compounds of the class consisting of acid potassium phosphate, bitartrate of potassium, tartaric acid, mucic acid, citric acid.

CARL A. NEUBERG.